No. 862,244. PATENTED AUG. 6, 1907.
M. GARRATT.
SCREW DRIVER.
APPLICATION FILED NOV. 6, 1906.

WITNESSES:
E. A. Pell
Ralph Lancaster

INVENTOR
Matthew Garratt
BY
Wm. H. Canfield
ATTORNEY

UNITED STATES PATENT OFFICE.

MATTHEW GARRATT, OF PASSAIC, NEW JERSEY.

SCREW-DRIVER.

No. 862,244.　　　Specification of Letters Patent.　　　Patented Aug. 6, 1907.

Application filed November 6, 1906. Serial No. 342,193.

*To all whom it may concern:*

Be it known that I, MATTHEW GARRATT, a subject of the King of Great Britain, residing at Passaic, in the county of Passaic and State of New Jersey, have invented certain new and useful Improvements in Screw-Drivers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention supplies a screw-driver that will enable the operator to tighten the screw much tighter, than is possible now, with the ordinary screw-driver, by providing a transverse lever on the shank for manipulating it.

An object of the screw-driver is to allow the easy working of the same, in situations where it is unhandy to work an ordinary screw-driver, and at the same time get a sufficient power to make the screw tight.

An object of the invention is to supply the shank of the screw-driver with a sliding sleeve, and on this sleeve is arranged the transverse handle, or lever, which is used to manipulate the shank when necessary, this sliding movement allowing it to be placed where it will be least obstructed, according to the nature of the work. A transverse handle, on the sliding sleeve, is provided with a ratchet mechanism that will allow it to be worked in either direction, according to the desired rotation of the shank.

The invention is illustrated in the accompanying drawings, in which

Figure 1:
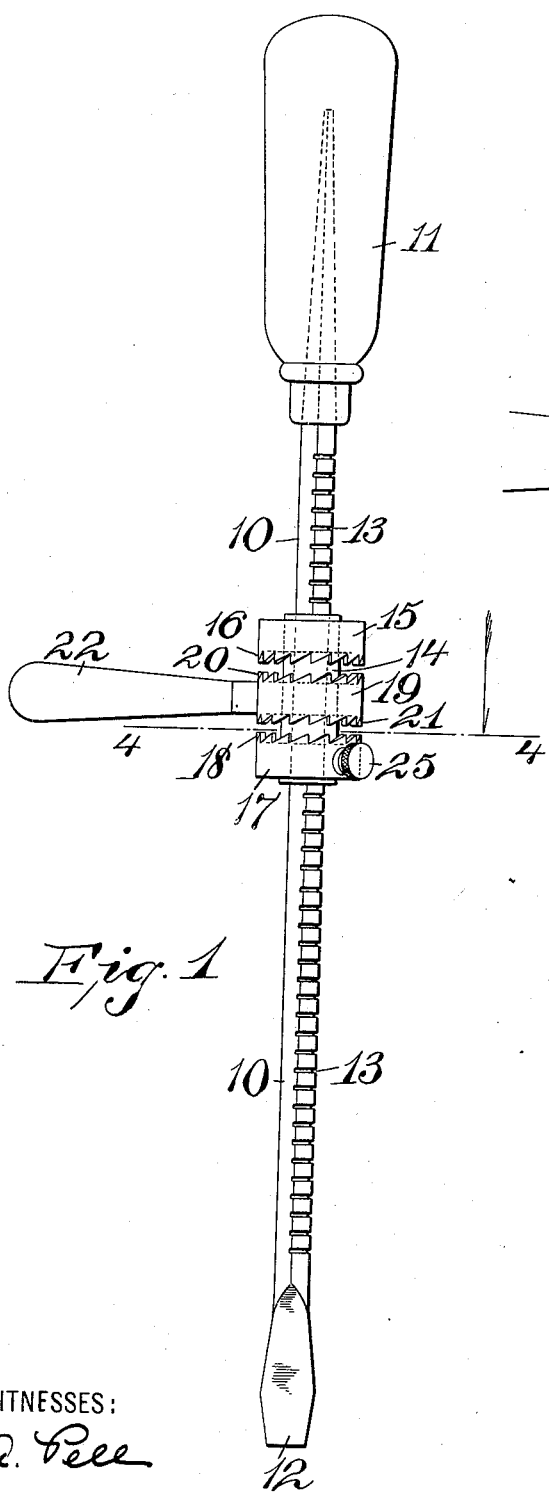
Figure 3:
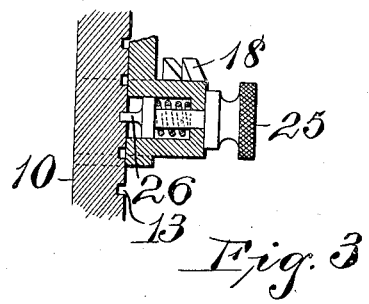
Figure 2:
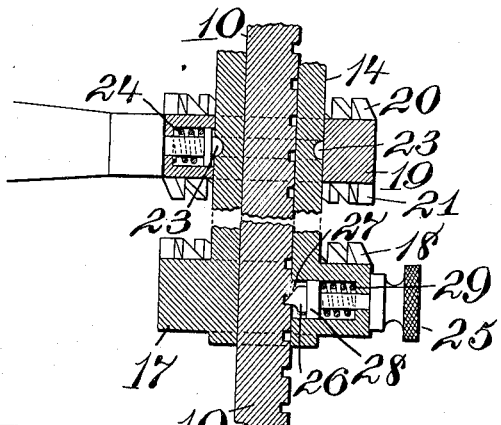
Figure 4:
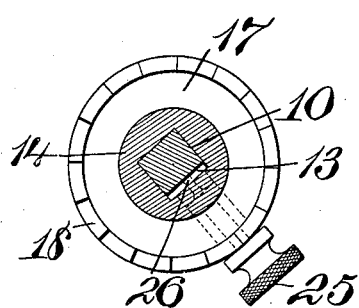

Figure 1 is a side view of the device. Fig. 2 is a part of the sliding sleeve on the shank, showing some of the detail. Fig. 3 is a section of the catch that holds the sleeve in its locked position, and Fig. 4 is a section on line 4, 4, in Fig. 1.

I provide the shank 10, which is square in cross-section, preferably, and which is provided, on one end with the handle 11, and with the screw engaging end 12. The handle 11 provides the use of the tool, as a screw-driver is ordinarily used. A sleeve 14 slides on the shank and is provided with a flange 15 having the ratchet teeth 16 on one edge, and a flange 17 which is provided with the opposed teeth 18. A collar 19 is rotatably arranged on the sleeve, and it has, on one edge, the ratchet teeth 20 adapted to engage the teeth 16, and on the opposed end the ratchet teeth 21 arranged to engage the teeth 18. On the rotating sleeve is the handle portion 22 which forms a lever, and this collar and its handle are normally held out of engagement with the flanges, on either side, by reason of the end of the handle 22 riding in an annular groove 23 in the sleeve 14, being held in engagement with the groove by the spring 24. When it is desired to operate the screw-driver, by means of the handle 22, the handle is pulled out, slightly, so that its end becomes disengaged from the groove 23, and it can then be slid along the sleeve 14 until it engages either the teeth 16 or the teeth 18, according to the direction desired for the rotation of the shank 10, and then the handle 22 can be operated, as in any ratchet construction, to turn the shank so as to secure a screw very tight in its place, or vice versa, to loosen a very tightly placed screw. This construction is particularly desirable where the operator is working adjacent to and parallel with a wall, or under a number of similar conditions, where a straight screw-driver is unhandy to use, especially on the left hand side of the operator.

I provide one of the flanges, in the illustration the flange 17, with a finger piece 25, the inner end of which has the nose 26, one edge of which is square, the other having the chamfered or beveled surface 27. This structure is held normally in engagement with a set of grooves or recesses 13, in one face of the shank 10, by reason of the pressure of the spring 29 on the washer 28. The illustration in Fig. 2 shows this mechanism arranged so that the whole leverage apparatus can be slid up but not down, and, of course, if the finger piece is turned around, a half revolution, the contrary will be the case and the sleeve could be slid down, but will be locked against accidental return. The thickness of the nose 26 is equal to the width of the recesses 13, and when it is turned half way, it fits in the grooves or slots 13, as shown in Fig. 3, thus securely locking the sliding sleeve 14 against any movement whatever.

It will thus be seen that I have devised a screw-driver that has an adjustable lever attachment enabling very much more power to be applied to it.

Having thus described my invention, what I claim is:—

1. A screw-driver comprising a shank, rectangular in cross-section, having screw engaging means on one end and having a handle on the other end, a sleeve having a rectangular perforation and fitting on the shank and adapted to slide longitudinally thereon, means for locking the sleeve on the shank, a rotating collar on the sleeve having ratchet teeth on its opposed edges, flanges on the sliding sleeve having ratchet teeth adjacent to the rotatable collar, means for holding the collar normally out of engagement with the teeth on the flanges, and a handle on the collar to operate it.

2. A screw-driver comprising a shank, square in cross-section, having screw engaging means on one end and a handle on the opposed end, the shank having transverse notches on one of its faces, a sleeve sliding on the shank, and having a rectangular perforation to fit the shank a ratchet attachment on the sleeve, a lever to operate the ratchet attachment, a spring actuated pin having a nose to fit in the notches on the shank, said nose being provided with one of its edges chamfered, so that when turned from a locking position, in either direction, it will act as a lock in that direction only, and a finger piece for manually operating the pin.

3. A screw-driver comprising a square shank with a handle on one end and screw engaging means on the other end, the shank having notches on one face, a sleeve fitting the shank and sliding thereon, flanges on the ends of the sleeve, the opposed faces of the flanges having ratchet teeth, a collar arranged to slide on the sleeve and having ratchet teeth on its opposed faces, a spring actuated handle on the collar having its inner end in engagement with the sleeve, the sleeve being provided with a groove between its flanges to receive the end of the handle, and a latch in one of the flanges of the sleeve arranged to engage the notches of the shank and lock the sleeve on the shank.

In testimony, that I claim the foregoing, I have hereunto set my hand this 22nd day of September, 1906.

MATTHEW GARRATT.

Witnesses:
WM. H. CAMFIELD,
E. A. PELL.